Feb. 9, 1960 J. W. BLACK 2,923,961
MECHANICAL DEVICE
Filed April 4, 1958 2 Sheets-Sheet 2
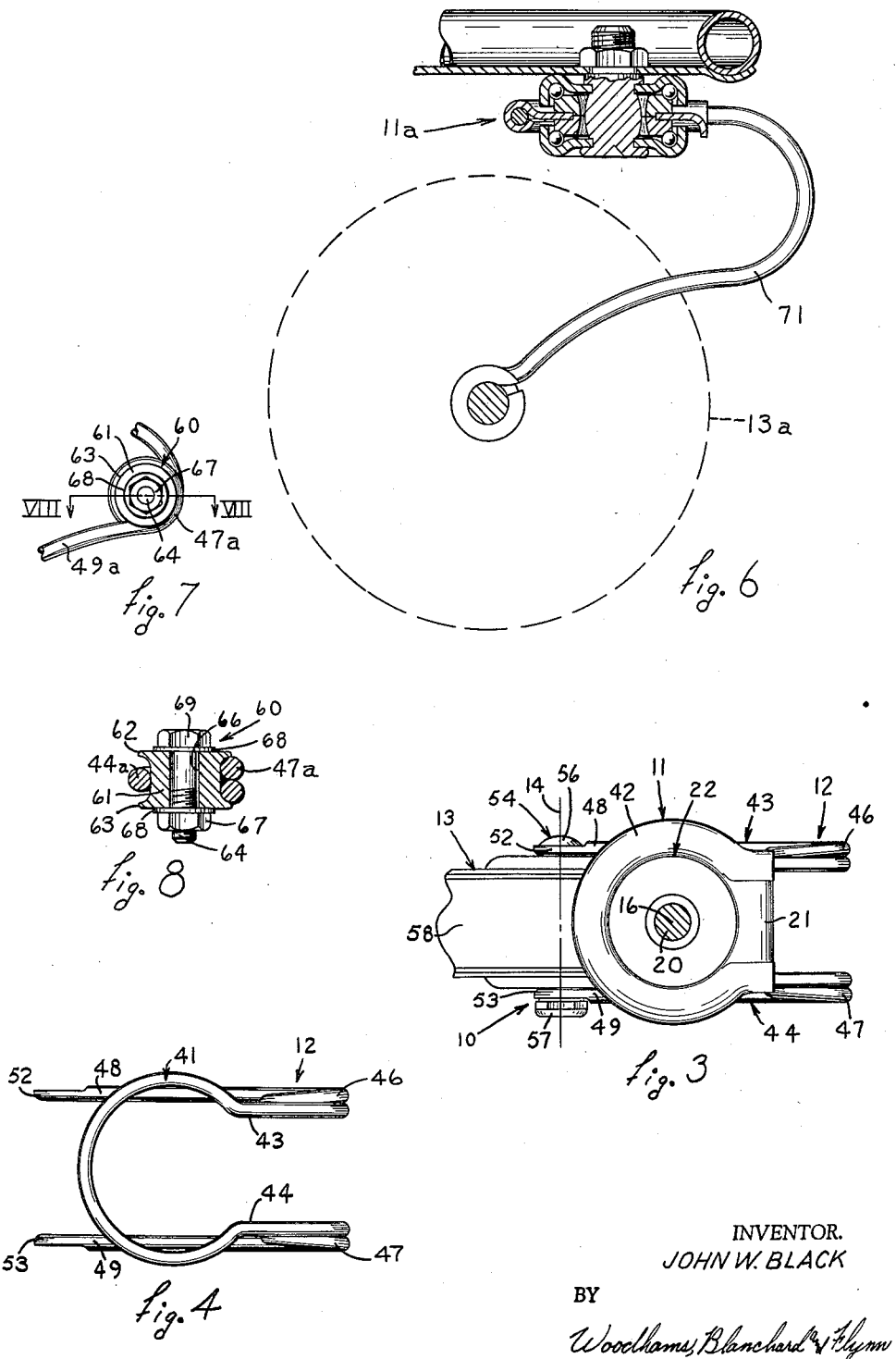
INVENTOR.
JOHN W. BLACK
BY
Woodhams, Blanchard & Flynn
ATTORNEYS

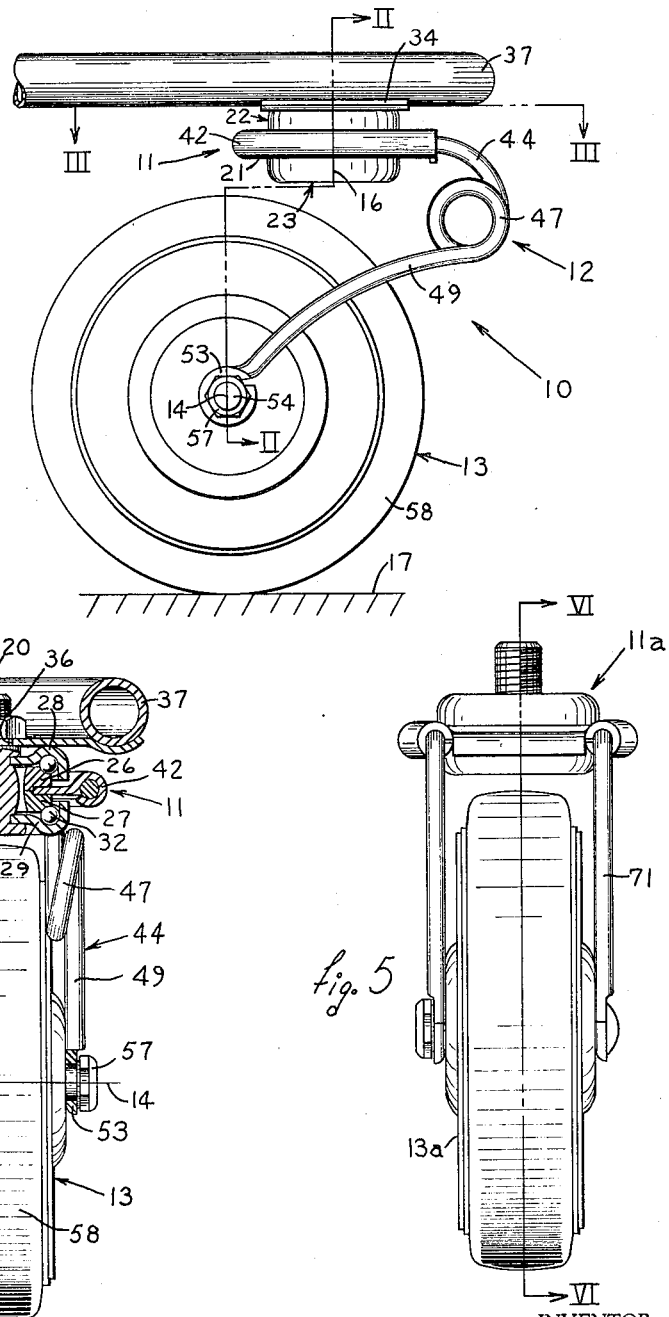

United States Patent Office 2,923,961
Patented Feb. 9, 1960

2,923,961

MECHANICAL DEVICE

John W. Black, Kalamazoo Township, Kalamazoo County, Mich., assignor to Pemco Wheel Company, Kalamazoo, Mich., a corporation of Michigan Application April 4, 1958, Serial No. 726,536

2 Claims. (Cl. 16—44)

This invention relates in general to a swivel caster construction and, more particularly, to a type thereof wherein the wheel is resiliently supported with respect to the swivel mechanism of the caster.

Although swivel casters have been used for a very long period of time, certain problems associated with their use have appeared to be incapable of solution. For example, it has been found necessary to provide a swivel caster with a much stronger swivel mechanism than would normally be required for supporting the dead weight of the object which is mounted upon such caster. That is, excessive strength must be built into said swivel mechanism in order to withstand the extra loads to which it is often subjected, such as the shock loads which occur when the caster is moved along the floor and strikes an obstruction.

The character of a swivel caster is such that the forces applied to the swivel mechanism are primarily cconcentrated in two relatively small zones on opposite sides of the swivel mechanism, which sides are usually at the front and rear of the caster. However, inasmuch as the caster is constantly changing directions so that these zones in the supporting swivel mechanism are continually changing location, it is necessary that the entire swivel mechanism be provided with the necessary strength.

The need for shock strength in the swivel mechanism of a swivel caster becomes particularly apparent in certain types of usage, such as, for example, on a wheeled market cart of the type adapted for use in a supermarket. Due to the varying load conditions which are applied to such market carts and, further, due to the varying conditions under which said market carts are used, it is necessary that they be provided with swivel caster structures which are capable of withstanding shock loads which are many times as great as the load which results from the dead weight of the market cart even under maximum load conditions. Needless to say, this problem is found in many other related and unrelated types of use and, therefore, specific reference to market carts is intended only for the purpose of illustration.

In addition to the added strength required in the swivel mechanism, the body of a swivel caster must for the same reasons also be considerably stronger than is necessary to support the dead weight load of the object supported by the caster. As a result, swivel casters must be fabricated from heavy duty, relatively high cost materials, and the parts of said swivel casters must be carefully and accurately produced in order to avoid localized weaknesses in the structure, which produce the first point of breakdown. Because of the need for heavy duty materials, both the fabrication and assembly procedures for producing such casters are correspondingly more difficult and more costly to perform.

This added strength in existing swivel casters must also be applied to the wheel and wheel mounting structures. That is, if the wheel supporting structure, including the swivel mechanism, is strengthened to resist increased shock loads, then the wheel also must be additionally stressed in order to avoid a breakdown therein, which also adds to the cost of present swivel casters, particularly of the type used where heavy shock loads are involved.

It has also been found that on conventional carts, such as market carts, where four wheels are mounted thereon, it is not unusual for only three of the wheels to be in actual load bearing contact with the floor, pavement or other supporting surface. Thus, the load of the cart is not only supported upon less than the number of wheels for which the structure was designed, but the non-engaging wheel tends to pivot, due to vibrations, into a non-castering position. Thus, when the non-engaging wheel again becomes engaged with the cart supporting surface, such wheel may be suddenly and violently jerked around into the castering position, thereby applying shock loads in a direction in which even an especially stressed swivel caster is not often adequately stressed.

It has also been found that, as a result of the inherent unevenness in many cart supporting surfaces, the wheels on the caster tend to shimmy if they are moved across such surface at a reasonably fast rate. It is believed that this is due to the fact that first one wheel and then another momentarily loses engagement with the cart supporting surface and begins to swivel around its swivel axis slightly due to the vibrations produced by movement of the cart before it re-engages the floor. A slight pivotal movement in one direction usually results in a swing to the opposite direction as soon as engagement of the wheel is again effected, and hence the shimmy occurs. The vibration and chatter resulting from such shimmying can cause more damage to the caster than a vigorously applied shock load.

It is also well-known that the movement of a castered wheel along a supporting surface is easily stopped, even by a small obstruction. This is partially due to the relatively small diameter of the average castered wheel, partially due to the rigid, sturdy structure required particularly in swivel casters and also due to other factors. Thus, there is a well established need for an improved caster structure capable of automatically riding over at least small obstructions.

Accordingly, a principal object of this invention has been the provision of a swivel caster construction which is capable of withstanding greater shock loads, which is automatically self-leveling, which can be produced at a substantial reduction in cost even though capable of supporting the same load, and which is capable of more satisfactory operation than previously known caster devices for the same purpose.

A further object of this invention has been the provision of a swivel caster construction, as aforesaid, wherein the wheel thereof is resiliently supported with respect to the swivel mechanism of the caster construction, wherein the swivel mechanism can be fabricated in a substantially conventional manner with existing equipment and procedures and wherein the resilience can be adjusted for varying load conditions.

A further object of this invention is the provision of a swivel caster construction, as aforesaid, which is extremely efficient in operation, which requires little or no maintenance, which is extremely sturdy in construction, which is pleasing in appearance and which is capable of riding over many of the small obstructions which will stop existing castered wheels, or cause them to skid.

Other objects and purposes of this invention will become apparent to persons familiar with this type of equipment upon reading the following specification and examining the accompanying drawings, in which:

Figure 1 is a side elevational view of a swivel caster construction embodying the invention.

Figure 2 is a sectional view substantially as taken along the line II—II of Figure 1.

Figure 3 is a sectional view substantially as taken along the line III—III of Figure 1.

Figure 4 is a top view of the flexible wheel supporting member.

Figure 5 is a front elevational view of a modified swivel caster construction embodying the invention.

Figure 6 is a sectional view substantially as taken along the line VI—VI of Figure 5.

Figure 7 is a fragment of the flexible member as shown in Figure 1 including a flexion adjusting device.

Figure 8 is a sectional view taken along the line VIII—VIII of Figure 7.

For the purpose of convenience in description, the terms "upper," "lower," "front," "rear" and derivatives thereof will have reference to the normal operating position and direction of movement of a swivel caster embodying the invention and as shown in Figures 1 and 6. The terms "inner," "outer" and derivatives thereof will have reference to the geometric center of said swivel caster construction and parts thereof.

*General description*

The objects and purposes of the invention, including those set forth above, have been met by providing an improved swivel caster construction comprised of a wheel, a swivel mechanism connectible to the object, such as a market cart, to be supported by the caster and a resiliently flexible member rotatably supporting said wheel upon, and with respect to, said swivel mechanism, said flexible member being pivotally engaged said swivel mechanism for movement about a swivel or castering axis transverse of the rotational axis of the wheel. In a preferred embodiment, the flexible member is comprised of a rod arranged in a U-shape having co-extensive, substantially parallel elements upon which said wheel is supported near the free ends of said elements. The closed end of said flexible member is secured to a swivel member, which is rotatably supported by bearing elements in the swivel mechanism. In order to provide adequate, non-fatiguing flexibility in the flexible member, one form thereof is curved through an arc in excess of 450 degrees. Control of the flexibility of the flexible member may be effected by a resiliently compressible device which is encircled by the curved portion of the flexible member.

*Detailed construction*

The swivel caster construction 10 (Figures 1 and 2), herein selected to illustrate an embodiment of the invention, is comprised of a swivel assembly 11 upon which a resiliently flexible member 12 is pivotally supported adjacent one end thereof. The other end of said member 12 rotatably supports a wheel 13 so that its rotational axis 14 is offset from the extended swivel axis 16 of the swivel assembly 11. The wheel is engageable with any supporting surface 17.

The swivel assembly 11 (Figure 2) in this particular embodiment is comprised of a mounting member 20, an annular swivel member 21 and a pair of bearing elements 22 and 23 which are disposed concentrically with, and on opposite sides of, the annular swivel member 21 for pivotally supporting said swivel member with respect to the mounting member 20. In general, the mounting member 20 and the bearing elements 22 and 23 may be substantially similar in structure, arrangement and operation with the corresponding elements disclosed and described in the co-pending application Serial No. 678,287, assigned to the assignee of this application.

Briefly, the bearing elements 22 and 23 (Figure 2), illustrated herein, have adjacent inner thrust rings 26 and 27 concentrically disposed on the upper and lower sides of the annular swivel member 21. The mounting member 20 may be a pin which extends through and above the thrust rings 26 and 27 and the swivel member 21. A pair of bearing ball retainer rings 28 and 29 are fixed upon the mounting pin 20 so that they concentrically encircle and substantially envelope said thrust rings 26 and 27. A plurality of bearing balls 31 and 32 are disposed respectively between the opposing thrust and retainer rings 26, 27, 28 and 29. The upper end of the mounting pin 20 is threaded for engagement by a nut 33. Thus, the swivel assembly 11 can be supported upon means such as a support bar 34 having an opening 36 through which said pin 20 can be slidably received. Alternatively, the mounting pin 20 may be connected to a mounting plate, as shown in said co-pending application Serial No. 678,287, which plate is in turn secured to said support bar 34. The support bar 34 may, in turn, be mounted upon the frame element 27 of means, such as a market cart. For further details with respect to the swivel assembly 11, reference is made to said co-pending application.

It will be recognized that other bearing structures may be provided in the swivel assembly 11 with equal applicability and, therefore, that the specific recitation of a particular bearing construction is for illustrative purposes, only, and is not intended to limit the invention. For example, an embodiment of the invention including a single bearing unit may under same circumstances meet many, if not most, of the objects of the invention. Moreover, it will be seen that the swivel member 21 may be easily adapted to many existing bearing constructions used in swivel casters. That is, the swivel member may, for example, be shaped to serve as part of the bearing raceways in a manner similar to that shown in Patent No. 1,341,630, issued to J. L. Chestnut.

The flexible member 12 (Figures 2 and 4) in this particular embodiment is composed of a substantially U-shaped rod having at its closed end a curved portion 41 (Figure 4) which defines in excess of 180 degrees of a circle. The swivel member 21 (Figure 3) is an annular plate having its edge portion 42 wrapped around said circular portion 41 (Figure 2) of the flexible member 12 so that said swivel member 21 is rigidly secured with respect to the swivel member 21 and said circular portion 41 is concentric with the swivel axis 16. The flexible member 12 also includes a pair of substantially parallel and co-extensive elements 43 and 44 which are curved through an arc in excess of 450 degrees. The major portion of such curvature in said elements 43 and 44 is preferably concentrated in the circular coils 46 and 47 which are near to, but spaced from, the swivel member 21. The flexible elements 43 and 44 have, therefore, substantially straight support arms 48 and 49 which extend rearwardly from the coils 46 and 47 for engagement with the wheel 13.

The rearward ends of the support arms 48 and 49 may be shaped by bending into integral, coaxial loops 52 and 53 through which the axle 54 is slidably received. It will be apparent, however, that the ends of the arms 48 and 49 may be flattened and pierced to receive the axle bolt, or may be connected to non-integral, axle bolt receptacles (not shown). The axle 54, which rotatably supports said wheel 13, may be a bolt having a head 56 at one end and a threadedly engaged nut 57 at the other end, whereby said support arms are held with respect to the axle 54. The wheel 13 may be of a substantially conventional type having a thread 58 fabricated from a resilient material, such as rubber.

*Operation*

The swivel caster 10 (Figures 1 and 2) can be mounted upon the frame element 37 of a market cart, for example, in a substantially conventional manner. Generally speaking, the operation of the swivel assembly 11 will be the same as that set forth in detail in the above-mentioned co-pending application. Briefly, the thrust rings 26 and 27 are fixed with respect to the swivel member 21 and rotate with respect to the retainer rings 28 and 29 by means of the bearing balls 31 and 32 disposed therebetween. Accordingly, the swivel member 21 will be freely movable about the swivel axis 16 of the mounting pin 20, which is secured by means of the nut 33 to the support bar 34. The flexible member 12, hence the wheel 13 supported thereon, will also be permitted to swivel freely about the swivel axis 16.

When the frame 37 is at rest with respect to the surface 17 supporting the wheel 13, the dead weight load will cause the support arms 48 and 49 to be flexed slightly upwardly from their unloaded positions so that a condition of balance is reached. As the frame 37 is now moved with respect to the wheel supporting surface 17, the support arms 48 and 49 will move upwardly and downwardly to compensate for the usual variations in the wheel supporting surface, such as floors, pavement and the like. Thus, said wheel 13 is substantially continuously held in engagement with said wheel supporting surface. If, during such movement the wheel 13 suddenly strikes an obstruction in its path, the coils 46 and 47 will permit the support arms 48 and 49 to flex upwardly a substantial amount, thereby permitting said wheel 13 to move up and over such obstruction. Thus, the flexible member 12 not only absorbs the initial shock load created by the impact of the wheel with the obstruction, but it also permits said wheel to move into a position where it can actually pass over an obstruction which would stop existing swivel casters.

If the obstruction is so large as to be incapable of permitting the wheel 13 to ride up over it, said support arms 48 and 49 will be flexed not only upwardly but rearwardly, thereby absorbing a substantial amount of the impact resulting from contact between said wheel and said obstruction. Accordingly, regardless of whether the obstruction engaged by said wheel 13 is a small one which can be rolled over or a large one which stops the wheel completely, the flexible member 12 is arranged to absorb the major part of the immediate impact between the wheel and the obstruction. It has been found that the flexible member not only tends to reduce the total shock load created by the said impact of the wheel 13 with an obstruction, but also tends to spread such shock load as does exist over a period of time. Accordingly, the swivel assembly 11 does not have to be stressed for absorbing the instantaneous, very high shock loads experienced by existing swivel casters.

*Modifications*

Under some circumstances, it may be desirable to vary the amount of flexibility in the flexible member 12 to compensate for variations in the load which said swivel caster 10 is normally intended to support. This can be accomplished by means of a flexion control 60 (Figures 7 and 8) which includes a resiliently compressible sleeve 61 inserted into the coil 47a, which may be substantially identical with either of the coils 46 and 47 of Figure 1. The sleeve 61 is preferably provided with radially outwardly extending flanges 62 and 63 at its opposite axial ends to prevent accidental dislodgment thereof from within said coil 47a. Means such as the bolt 64 is inserted through the central opening 66 in the sleeve 61 and is threadedly engaged by the nut 67. Washers 68 are sleeved upon the bolt 64 adjacent to the axial ends of the sleeve 61. The compressibility of the resilient sleeve 61 in a radial direction is dependent, at least in part, upon its freedom to expand in an axial direction. Thus, the radial compressibility of the sleeve 61 can be adjusted by controlling the space between the bolt head 69 and the nut 67.

It will be seen that the diameter of the coil 47a will tend to reduce when the element 49a is flexed upwardly. Thus, if it becomes desirable to limit the flexibility of the flexible element 49a, the nut 67 is tightened on the bolt 64, thereby compressing the sleeve 61. Such compression resists the tendency for the coil 47a to reduce its diameter, and thereby reduces the flexibility of the flexible element 49a. Moreover, the nut 67 and bolt 64 can be adjsuted to oppose axial expansion of the sleeve 61 at a selected point and thereby act as a shock absorber.

That is, said sleeve 61 is utilized to prevent a sudden, violent shock load upon the wheel 13 from causing the wheel 13 to move upwardly against the frame element 27 (Figure 1) and cause damage. The shock absorbing quality of said sleeve may also be controlled by adjusting the distance between the nut 67 and bolt head 69.

Under some circumstances, at least some of the objects and purposes of the invention may be carried out by means of a flexible member 71 (Figures 5 and 6), which is substantially similar to the flexible member 12 except that said member 71 does not contain a coil 46, for example. Accordingly, the flexible member 71 is not adapted for adjustment by means of a flexion control 60 (Figure 7). However, said member 71 does provide the resilient cushioning effect between the swivel assembly 11a and the wheel 13a.

Although particular preferred embodiments of the invention have been disclosed above in detail for illustrative purposes, it will be understood that variations or modifications of such disclosure, which lie within the scope of the appended claims, are fully contemplated.

I claim:

1. A swivel caster construction including a resiliently flexible yoke, comprising: a swivel plate having a central opening, a substantial portion of the periphery of said plate being bent downwardly and then inwardly to form a gripping flange; an elongated, resiliently flexible element bent approximately midway between the ends thereof to form a substantially U-shaped member having a pair of substantially parallel legs, the closed end of said member being snugly engaged by said gripping flange and rigidly held thereby with respect to said swivel plate, each leg curving downwardly and rearwardly through an angle in excess of approximately 145°; an axle and means on the lower ends of said legs engaging said axle near the opposite ends thereof; a wheel rotatably supported upon said axle between said legs; means operatively associated with said swivel plate inwardly of said flange and defining a pair of thrust rings on the upper and lower sides of said swivel plate; a pair of coaxial bearing ball retainer rings respectively located adjacent to, and on the upper and lower sides of, said thrust rings; a plurality of bearing balls disposed between each thrust ring and its corresponding retainer ring; and a spindle extending coaxially through said swivel plate, said thrust rings and said retainer rings, said spindle being rigidly secured to said retainer rings and said retainer rings being spaced axially from each other.

2. The structure of claim 1 wherein said thrust rings are substantially identical and coaxial, said thrust rings having notches in their adjacent surfaces defining an annular recess into which the portion of said swivel plate adjacent to the central opening therein is snugly received; wherein said bearing retainer rings are substantially equal in diameter; wherein each leg has a curved portion remote from said axle, which portions define a pair of substantially coaxial loops; and including a pair of resiliently flexible sleeves, one sleeve being snugly disposed within each of said loops, respectively; a pair of bolts slidably extending through said sleeves and a means engageable with each bolt for compressing said resilient sleeves axially whereby said sleeve is urged to expand radially against the said loops for braking circumferential motion occurring therein.

References Cited in the file of this patent

UNITED STATES PATENTS

| 420,990 | Cook | Feb. 11, 1890 |
| 2,090,960 | Kronkle | Aug. 24, 1937 |
| 2,453,916 | Inskeep | Nov. 16, 1948 |
| 2,714,517 | Powell | Aug. 2, 1955 |

FOREIGN PATENTS

| 450,893 | Great Britain | July 27, 1936 |